United States Patent [19]

Yonker

[11] Patent Number: 4,765,427

[45] Date of Patent: Aug. 23, 1988

[54] AUXILIARY PUMP SYSTEM FOR VARIABLE EFFORT POWER STEERING

[75] Inventor: John F. Yonker, Frankenmuth, Mich.

[73] Assignee: General Motors Corporation, Detroit, Mich.

[21] Appl. No.: 80,905

[22] Filed: Aug. 3, 1987

[51] Int. Cl.$^4$ .............................................. B62D 5/08
[52] U.S. Cl. .................................. 180/143; 180/133; 180/141; 91/375 A
[58] Field of Search ............... 180/132, 133, 141, 143, 180/6.48; 74/388 PS; 91/375 A

[56] References Cited

U.S. PATENT DOCUMENTS

| | | | |
|---|---|---|---|
| 3,998,131 | 12/1976 | Adams | 91/372 |
| 4,034,825 | 7/1977 | Adams | 180/143 |
| 4,434,866 | 3/1984 | Duffy | 180/143 |

Primary Examiner—John J. Love
Assistant Examiner—Donn McGiehan
Attorney, Agent, or Firm—Saul Schwartz

[57] ABSTRACT

An auxiliary pump system for providing detent pressure in a detent-type variable effort power steering system. The auxiliary pump system includes a gerotor-type auxiliary pump mounted on the transmission of the vehicle and driven at a speed proportional to vehicle speed. The primary power steering pump supplies power steering fluid to the power steering gear and all of the power steering fluid exhausting from the steering gear is directed to the intake of the auxiliary pump. The auxiliary pump produces detent pressure when the vehicle is in motion proportional to vehicle speed and the overage of power steering fluid is directed back to the power steering pump reservoir. From a cold start, the power steering fluid consumed by the auxiliary pump heats faster due to passage through the power steering pump than if drawn directly from the reservoir thereby to minimize the duration during which detent pressure is susceptible to viscosity induced pressure instability.

2 Claims, 1 Drawing Sheet

AUXILIARY PUMP SYSTEM FOR VARIABLE EFFORT POWER STEERING

BACKGROUND OF THE INVENTION

1. Field of the Invention

This invention relates generally to automotive power steering systems and, more particularly, to variable effort power steering systems.

2. Description of the Prior Art

In typical power steering gears for automobiles, a valve which controls pressurization of the steering assist fluid motor is actuated by relative angular displacement between a spool rotatable with an input member of the steering gear and a sleeve rotatable with an output member of the steering gear. A torsion bar between the input and output members centers the sleeve and spool and resists such relative angular displacement between the input and output members. To increase "road feel" at highway speeds, detent type variable effort systems have been proposed wherein detents on the output member are urged by a fluid detent pressure into grooves in the input member. The detent pressure is produced by an auxiliary pump system including an auxiliary pump driven at speeds proportional to the speed of the vehicle. Since the detent pressure is effected by the viscosity of the detent fluid, unstable detent pressures may be experienced after cold starts. An auxiliary pump system according to this invention embodies a simple, economical and effective arrangement for minimizing the time duration after a cold start during which the detent fluid is susceptible to viscosity related pressure instability.

SUMMARY OF THE INVENTION

This invention is a new and improved auxiliary pump system for a detent type variable effort automotive power steering system. In the auxiliary pump system according to this invention, an auxiliary pump is mounted on a power transmission of the vehicle and is driven at a speed proportional to vehicle speed. The auxiliary pump has an intake port connected to the exhaust port of the power steering gear of the vehicle so that the entire flow of power steering fluid is directed to the intake of the auxiliary pump at the exhaust pressure of the steering gear. The auxiliary pump uses a portion of the power steering fluid flow to produce detent pressure for the variable effort detent system at a high pressure discharge port of the auxiliary pump. The remainder of the power steering fluid exits the auxiliary pump through a low pressure discharge port connected to the intake port of the auxiliary pump and returns to the power steering pump reservoir through a return hose between the low pressure discharge port and the reservoir. Since the entire flow of the power steering fluid passes through the intake quadrant of the auxiliary pump, the temperature of the fluid at the auxiliary pump intake increases and stabilizes more rapidly than if the fluid were drawn directly from a separate reservoir thereby minimizing the time duration during which the viscosity of the fluid renders the same susceptible to pressure instability. In addition, the auxiliary pump operates with increased efficiency because a measurable level of back pressure in the return hose to the reservoir pressurizes the auxiliary pump intake.

DESCRIPTION OF A PREFERRED EMBODIMENT

Figure 1:
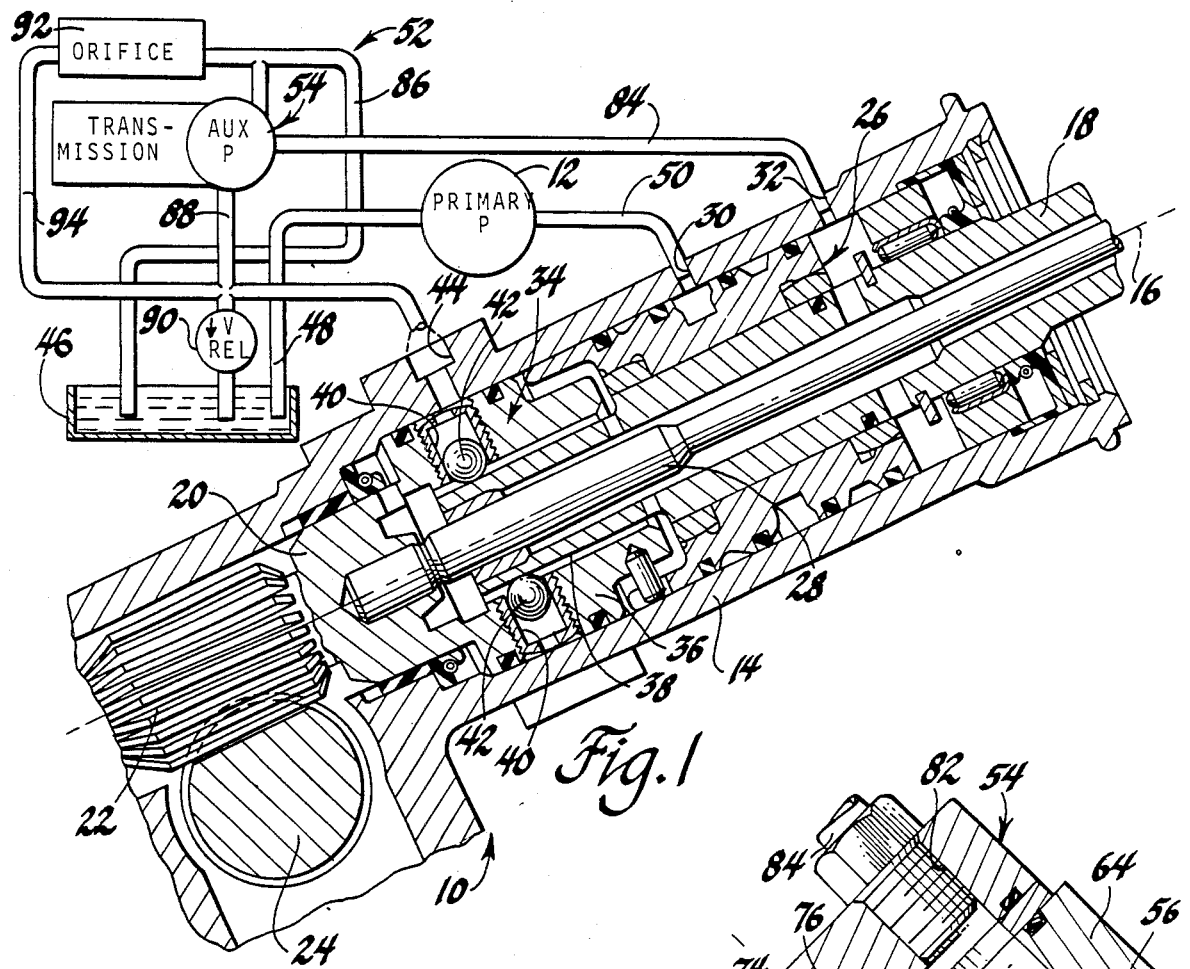
FIG. 1 is a schematic representation of a variable effort automotive power steering system having an auxiliary pump system according to this invention.

Referring now to FIG. 1 of the drawings, a schematically illustrated variable effort power steering system for an automobile includes a rack and pinion power steering gear 10 and an engine driven primary power steering pump 12. The power steering gear 10 is described in detail in U.S. patent application Ser. No. 074,087, filed July 16, 1987, by William R. Schipper, Jr. et al, and assigned to the assignee of this invention. The power steering gear 10 includes a housing 14 defining an axis 16. A stub shaft 18 or input member of the steering gear 10 is supported on the housing 14 for rotation about the axis 16 and is connected at its right end, not shown, to the steering wheel of the vehicle. A pinion shaft 20 or output member of the steering gear 10 is supported on the housing 14 for rotation about the axis 16 and has an integral pinion gear 22 which meshes with rack teeth on a steering rack 24. The steering rack is connected to the steered road wheels of the vehicle and to a steering assist fluid motor, not shown. The fluid motor has a pair of working chambers each of which, when pressurized with hydraulic fluid, moves the steering rack in a corresponding direction.

The power steering gear 10 further includes a rotary control valve 26 in the housing 14 having a spool rotatable with the stub shaft and a sleeve rotatable with the pinion shaft. Relative angular displacement about the axis 16 through a small included angle is permitted between the stub shaft and the pinion shaft before a direct mechanical driving connection is established. A torsion bar 28 is connected at one end to the stub shaft 18 and at the other end to the pinion shaft 20. The torsion bar 28 defines an open center position of the rotary valve 26 wherein both working chambers of the steering assist fluid motor are ported to a supply pressure port 30 on the housing 14 and to an exhaust port 32 on the housing 14. During relative angular displacement between the stub shaft and pinion shaft, the rotary valve ports one of the working chambers of the steering assist fluid motor to the supply pressure port 30 and the other to the exhaust port 32 whereby power assisted steering is achieved in conventional fashion.

The steering gear 10 further includes a representative detent type variable effort system 34 between the stub shaft 18 and a detent support portion 36 of the pinion shaft 20. The variable effort system 34 is described in detail in the aforesaid patent application and includes a plurality of longitudinal grooves 38 in the stub shaft and a corresponding plurality of radial bores 40 in inserts on the detent support portion 36. The bores 40 are aligned with the grooves 38 in the open-center position of the rotary valve 26.

A detent ball 42 is closely received in each radial bore 40 and is urged into the corresponding groove 38 by fluid detent pressure in the radial bores. The fluid providing the detent pressure is directed into the radial bores 40 through a detent pressure port 44 on the housing 14. Detent pressure urges the detent balls 42 into the grooves 38 whereby the detent balls resist relative angular displacement between the stub shaft 18 and the pinion shaft 20 with forces proportional to detent pressure. In the absence of detent pressure, the detent balls do not resist relative angular displacement between the stub shaft and the pinion shaft.

The power steering pump 12 is a conventional engine driven pump which operates continuously when the engine is on. The pump 12 draws fluid from a reservoir 46 through an intake hose 48 and discharges fluid through a pressure hose 50 connected to the supply pressure port 30 on the housing 14. In the open center position of the rotary valve 26, the flow of power steering fluid from the supply pressure port 30 to the exhaust port 32 is substantially unrestricted and the pressure in pressure hose 50 is low. When the rotary valve is displaced from the open center position, pressure in the pressure hose 50 rises in proportion to the relative angular displacement between the stub shaft 18 and the pinion shaft 20 while fluid at low pressure continues to exit the steering gear through the exhaust port 32.

Figure 2:
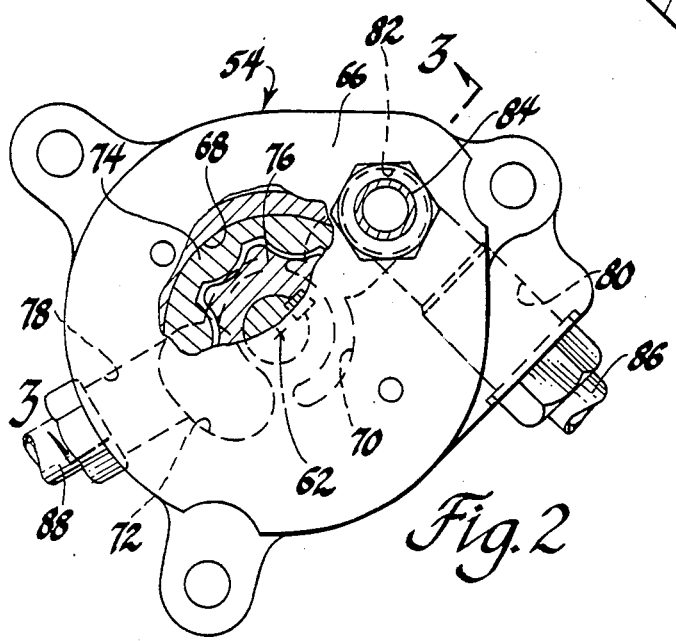
FIG. 2 is a partially broken away plan view of an auxiliary pump of the auxiliary pump system according to this invention.
Figure 3:
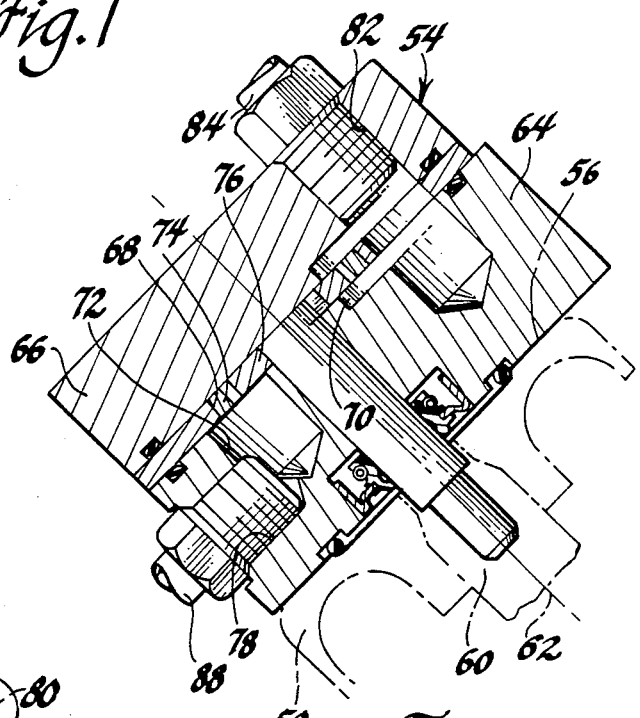
FIG. 3 is a sectional view taken generally along the plane indicated by lines 3—3 in FIG. 2.

Referring now to FIGS. 1–3, an auxiliary pump system 52 according to this invention is included in the power steering system to supply detent pressure to the detent pressure port 44 on the housing 14. The auxiliary pump system 52 includes an auxiliary pump 54 disposed on a flat surface 56 of a schematically illustrated housing portion 58 of the transmission of the vehicle. Typically, the transmission has a speedometer gear drive shaft 60 which rotates about an axis 62 of the transmission at a speed which is linearly proportional to the speed of the vehicle.

The auxiliary pump 54 is conveniently a so-called gerotor-type pump having a housing base 64 and a housing cover 66 attached to the base and cooperating therewith in defining a pump chamber 68. The pump chamber 68 has an intake quadrant 70 and a discharge quadrant 72. A toothed pump ring 74 is disposed in the pump chamber 86 and rotates about a center offset from the axis 62. A toothed rotor 76 is disposed within the ring 74 and is connected to the distal end of the drive shaft 60 for rotation as a unit with the latter about the axis 62. As seen best in FIGS. 2 and 3, the housing base 64 has a high pressure discharge port 78 therein communicating with the discharge quadrant 72 and a low pressure discharge port 80 communicating with the intake quadrant 70. The housing cover 66 has an intake port 82 therein communicating with the intake quadrant 70 and with the low pressure discharge port 80.

Referring again to FIG. 1, an intermediate hose 84 extends between the exhaust port 32 on the housing 14 and the auxiliary pump intake port 82. A discharge hose 86 extends from the auxiliary pump low pressure discharge port 80 to the fluid reservoir 46. A detent pressure hose 88 extends from the auxiliary pump high pressure discharge port 78 to the detent pressure port 44 on the housing 14. A pressure relief valve 90 limits pressure in the detent pressure hose 88. A detent pressure control orifice 92, which may be fixed or adjustable, is situated in a branch passage 94 extending from the detent pressure hose 88 to the discharge hose 86.

The power steering system operates as follows. The power steering pump 12 circulates power steering fluid through the power steering gear whenever the engine of the vehicle is on. All of the power steering fluid from the power steering gear flows through the intermediate hose 84 and passes through a portion of the intake quadrant 70 of the auxiliary pump 54 before returning to the reservoir 46 through the discharge hose 86. If the vehicle is stationary, the drive shaft 60 is likewise stationary so the detent pressure in the detent pressure hose 88 is zero. Under these conditions, when the steering wheel is turned the detent balls 42 do not resist relative angular displacement between the stub shaft 18 and the pinion shaft 20 so that minimum amount steering effort is necessary to turn the steering wheel.

When the vehicle begins moving forward, the shaft 60 turns the rotor 76 at a speed proportional to the forward speed of the vehicle. Accordingly, a portion of the fluid passing through the intake quadrant 70 of the auxiliary pump is transported by the rotor 76 from the intake quadrant to the discharge quadrant 72 and pumped into the detent pressure hose 88. The fluid quickly fills the detent pressure hose and the volume behind the detent balls 42 whereupon detent pressure develops behind the detent balls which is proportional to the flow rate of fluid from the auxiliary pump and, hence, to the speed of the vehicle. The magnitude of the detent pressure for any given vehicle speed depends upon the flow area of the orifice 92. A degree of flexibility may be incorporated in the auxiliary pump system 52 by including means, not shown, for adjusting the size of the orifice.

The routing of all of the power steering fluid exhausting from the steering gear through a portion of the intake quadrant 70 of the auxiliary pump 54 is an important feature of this invention. More particularly, the viscosity of typical power steering fluid decreases at greater than a linear rate as the temperature of the fluid increases from temperatures characteristic of vehicle cold starts. The initial high viscosity of the power steering fluid creates a potentially unstable pressure condition behind the detent balls 42 in the sense that the detent pressure produced by auxiliary pump 54 is higher due to increased viscosity than it would otherwise be at the same speed of the rotor 76 but with the power steering fluid at a higher temperature and lower viscosity. If the detent pressure is higher than intended due to high viscosity, then the power assist characteristics of the steering system will, likewise, not correspond to the intended characteristics.

In the auxiliary pump system 52 according to this invention, the fluid supply for the auxiliary pump circulates through the power steering pump 12 and the power steering gear 10 before it reaches the intake quadrant of the auxiliary pump. Accordingly, that fluid experiences significantly more heat input than would otherwise be the case if the auxiliary pump were simply to draw fluid directly from the reservoir 46. Therefore, the time duration during which the viscosity of the fluid is significantly higher than its steady state operating viscosity is reduced to an absolute minimum without the use of expensive pressure transducers and control apparatus for modulating the pump output to control detent pressure after a cold start.

In addition, it is advantageous to mount the auxiliary pump 52 on the transmission housing portion 58 because the transmission, due to its many rotating components, has a tendency to heat to a steady state operating temperature relatively quickly. With the auxiliary pump mounted directly on the transmission housing, the auxiliary pump operates like a heat sink and therefore also tends to reach a steady state operating temperature relatively quickly and even further reduce the time duration during which elevated power steering fluid viscosity levels could effect detent pressure.

The embodiments of the invention in which an exclusive property or privilege is claimed are defined as follows:

1. In a variable effort power steering system for an automotive vehicle of the type including,
    a power steering pump continuously driven by an engine of said vehicle whenever said engine is operating and having an intake port and a discharge port,
    a fluid reservoir connected to an intake port of said power steering pump whereby said power steering pump delivers a continuous supply of power steering fluid at said discharge port when said power steering pump is being driven,
    a power steering gear having a pressure port connected to said discharge port of said power steering pump and an exhaust port,
        said power steering pump substantially continuously circulating power steering fluid through said power steering gear from said pressure port to said exhaust port; and
    detent means on said power steering gear between an input member of said power steering gear and an output member of said power steering gear operative to resist relative angular displacement therebetween in proportion to the magnitude of a fluid detent pressure operating on said detent means,
an auxiliary pump system comprising:
an auxiliary pump having an intake port and a high pressure discharge port and a pump rotor operative when rotated to pump fluid from said intake port to said high pressure discharge port at a flow rate proportional to the speed of said rotor,
    means mounting said auxiliary pump on a power transmission of said vehicle with a vehicle speed responsive shaft of said transmission connected to said auxiliary pump rotor whereby said auxiliary pump rotor is driven at a speed proportional to the speed of said vehicle,
    means connecting said auxiliary pump high pressure discharge to said detent means so that said fluid output of said auxiliary pump provides said detent pressure proportional to the speed of said vehicle,
    means defining low pressure discharge port on said auxiliary pump connected to said intake port of said auxiliary pump,
    means connecting said power steering gear exhaust port to said auxiliary pump intake port whereby all of the fluid discharge from said power steering gear is directed into said auxiliary pump intake port,
        the overage of fluid supplied to said auxiliary pump intake port being discharged from said
    auxiliary pump through said low pressure discharge port, and
    means connecting said auxiliary pump low pressure discharge port to said power steering pump reservoir whereby the overage of fluid supplied to said auxiliary pump intake port is returned to said reservoir.

2. The auxiliary pump system recited in claim 1 wherein said auxiliary pump is a gerotor pump.

* * * * *